United States Patent [19]

Moore

[11] 4,137,897

[45] Feb. 6, 1979

[54] UNIFIED ARRAY FOR COLLECTION AND CONCENTRATION OF SOLAR ENERGY

[76] Inventor: Walter T. Moore, 782 Mardigras Ct., Camarillo, Calif. 93010

[21] Appl. No.: 804,448

[22] Filed: Jun. 7, 1977

[51] Int. Cl.² ............................................. F24J 3/02
[52] U.S. Cl. ................................. 126/270; 126/271; 350/293; 350/299
[58] Field of Search .............. 126/270, 271; 237/1 A; 60/641; 350/288, 292, 293, 299; 250/203 R; 353/3

[56] References Cited

U.S. PATENT DOCUMENTS

| | | | |
|---|---|---|---|
| 3,009,391 | 11/1961 | Zagieboylo et al. | 126/270 |
| 3,466,119 | 9/1969 | Francia | 126/270 |
| 3,884,217 | 5/1975 | Wartes | 126/270 |
| 3,892,433 | 7/1975 | Blake | 126/270 |
| 3,905,352 | 9/1975 | Jahn | 126/270 |
| 3,982,527 | 9/1976 | Cheng et al. | 126/270 |
| 4,050,777 | 9/1977 | Peters | 126/270 |
| 4,052,976 | 10/1977 | Hinterberger | 126/271 |

*Primary Examiner*—Kenneth W. Sprague
*Assistant Examiner*—James C. Yeung

[57] ABSTRACT

A reflector array is disclosed that provides for the collection and concentration of a relatively constant daily total quantity of usable energy for one or more energy receivers through use of a collector array support configuration that provides for the efficient use of collector surface and land. This is accomplished by combining a plurality of collectors with a support structure wherein the collectors are carried by a terraced support surface of the structure and the reflective surfaces of the collectors lie in essentially a common sun facing plane at noon. In a preferred embodiment, the terraced support surface is a terraced east-west extending wall of an enclosure such as comprising a residential, commercial or industrial building.

23 Claims, 14 Drawing Figures

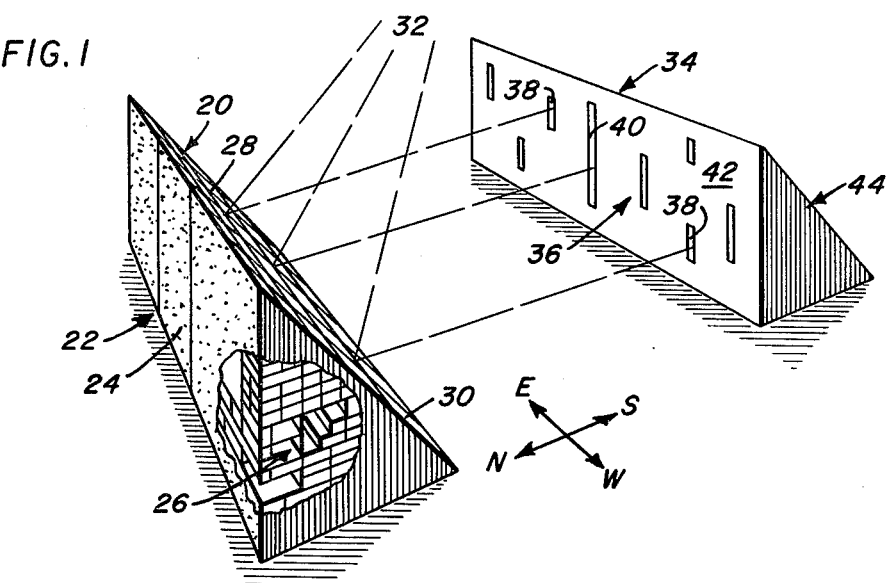
FIG. 1
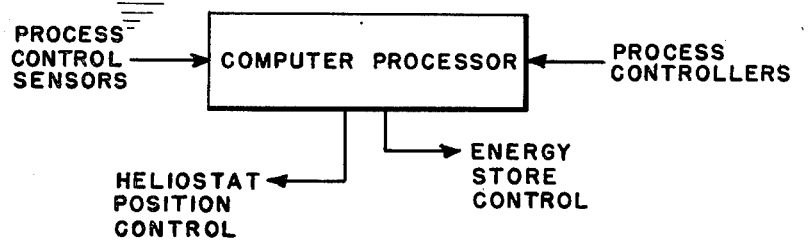
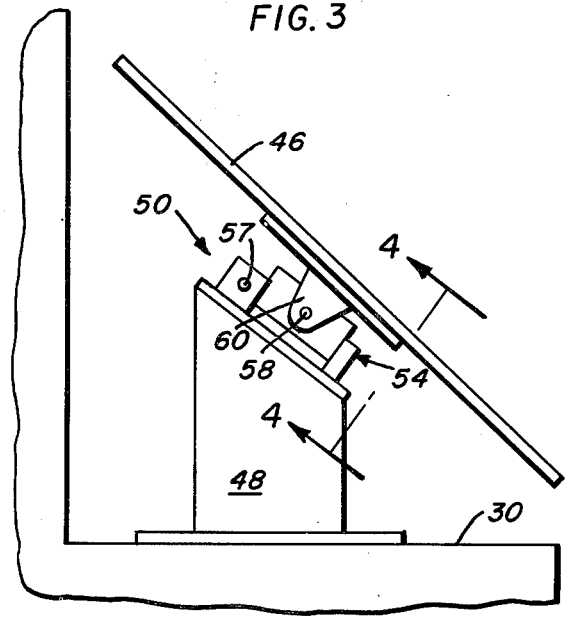
FIG. 3
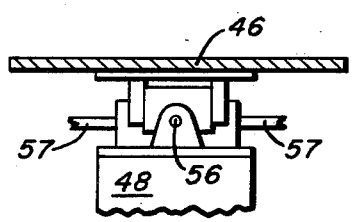
FIG. 4

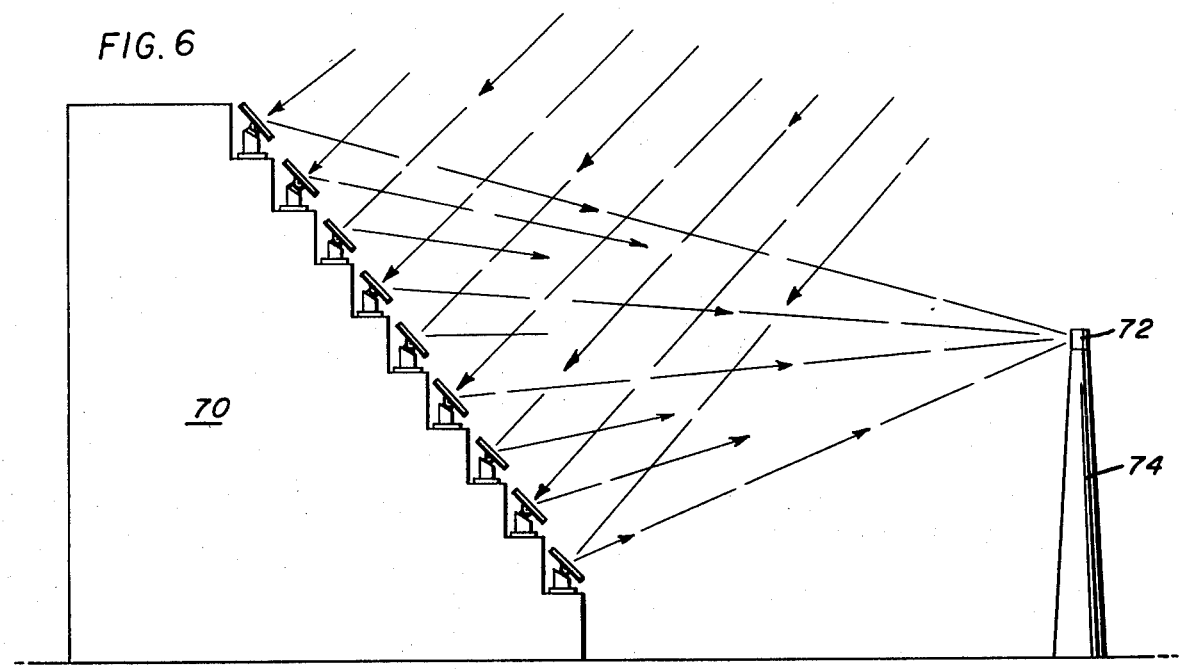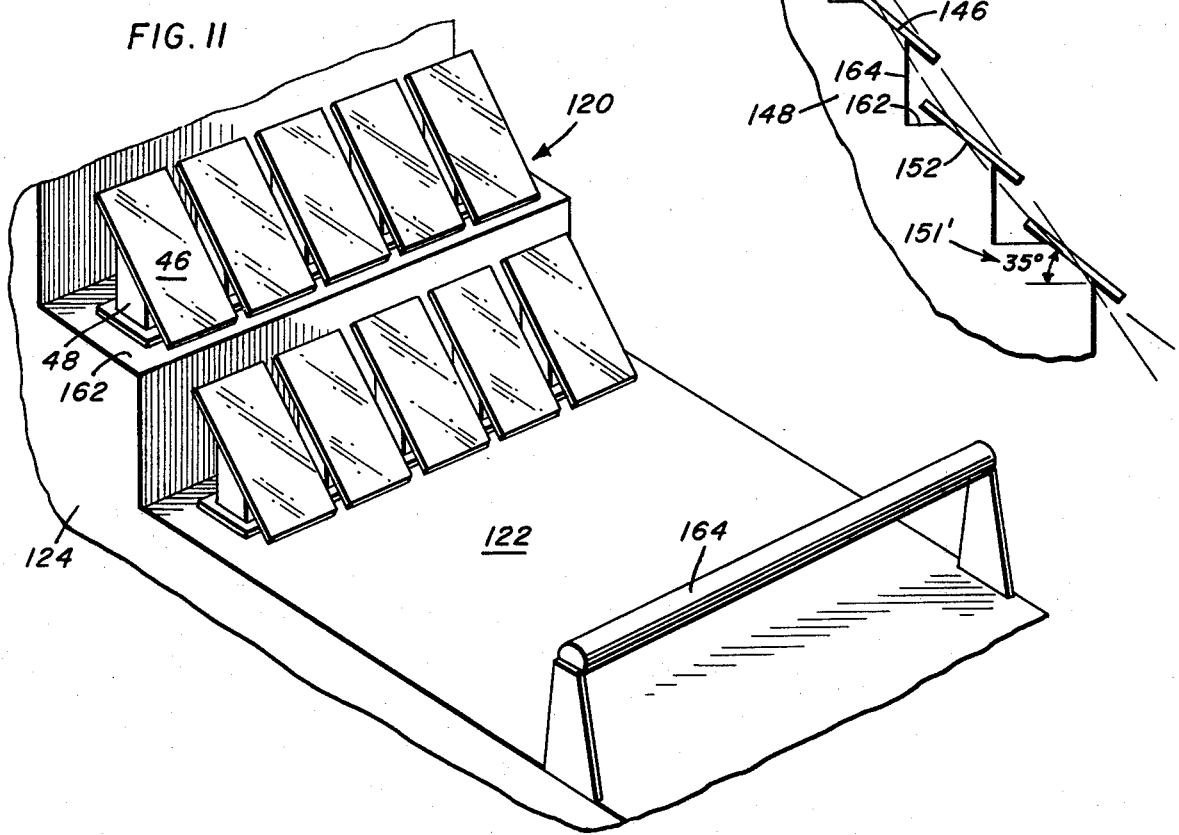

UNIFIED ARRAY FOR COLLECTION AND CONCENTRATION OF SOLAR ENERGY

BACKGROUND OF THE INVENTION

The continuing depletion of fossil and nuclear fuels may be one of the most significant long term problems facing the world. There is condiderable disagreement regarding the size of the depletable fossil and nuclear fuel resources. Thus, increasing interest is now centered about renewable energy resources such as solar energy.

The collection and concentration of solar energy is an ancient art and accordingly over the span of many centuries numerous solar energy collector and concentrator systems have been devised. Until relatively recently the total solar energy collection and concentration capability of such systems was relatively small and generally confined to heating systems or endothermic industrial processes requiring relatively low levels of energy input.

These prior art systems generally can be characterized as fixed or movable arrays of reflectors wherein the array elements may be fixed at a given azimuth or configured to comprise heliostat elements that include means for adjustment that enables automatic or manual tracking of the sun to maximize solar energy collection and concentration.

The movable arrays are generally carried by a sun tracking support that is moved through a predetermined orbit to track around an axially disposed energy receiver, such as a furnace, boiler, vaporizer, etc. As will be readily appreciated, the energy collection capability, or capacity, of such movable arrays is as a practical matter rather limited in view of the engineering problems attendant the movement of relatively large arrays.

Thus, more recent attempts to collect relatively large amounts of solar energy for concentration and utilization for electrical power generation, industrial uses, and the like, have been centered about the utilization of a solar array collector system herein referred to as a distributed field heliostat array. As is well known, the collector arrays presently generally used in the United States Energy Research and Development Administration Solar Thermal Conversion Central Power Projects utilize the distributed field heliostat array that distributes numerous heliostats over a field, commonly a very large tract of land, and wherein the substantial number of heliostats are each separately supported on pedestals, or foundations, in the distributed field. Since large expanses of collector surfaces are expensive, and since land values in industrialized areas are generally very high, a primary factor in reducing the capital investment directly attributable to the development of solar energy for industry is the efficient use of collector surface and land.

In addition, an energy receiver generally associated with a distributed field array comprises an energy receiver means mounted on a tower and wherein the energy receiver requires an entry port for collected and concentrated solar energy. In such an installation the entry port has a relatively wide aperture angle and to increase the energy input to the central receiver the spacing between the collector array and the central receiver must increase if the central receiver entry port aperture angle remains constant. In the distributed field collector array systems this requires vertical separation between the collector array and the central energy receiver.

The system described, which has been referred to as a power tower system in a presently proposed project for 100 MWe being developed as a booster system for an existing electrical generation plant, contemplates acres of mirrors in a field to reflect the sun's heat to a water boiler stop a 1000-foot tower. More specifically the proposed project envisions the utilization of at least 170 acres of land to accommodate the distributed field of collectors, or heliostats. Alternatively the same project proposes to attempt to utilize three towers each 430 feed high instead of a single 1000-foot tower.

It will be appreciated that central receiver towers of the aforementioned height introduce possible air space and construction problems. Further, the energy concentration ratio for a given collector array is partially a function of shading of one collector element by another due to sun position or angle off the axis of the central receiver energy collector aperture and also shading of collector elements by the tower and boiler structure. Shading in the distributed field collector, or heliostat, array systems is a function of both solar declination and the time of day.

An open sky collector system is exemplified by U.S. Pat. No. 3,118,437, Jan. 21, 1964, which also appears to be closely related structurally to a solar energy collection system at Odeillo, France. Such systems are considered to be representative of the prior art systems that attempt to concentrate, as well as collect solar energy from the previously discussed distributed field heliostat arrays. These systems are characterized by the utilization of duplex reflector systems which it will be appreciated are not generally suitable for concentration of solar energy at a high order as is required for cost effective solar energy utilization for power generation, and the like.

As the description of the present invention proceeds additional distinguishing aspects and advantages will be set forth with reference to the distributed field array system discussed.

SUMMARY OF THE INVENTION

The present invention relates to a solar energy collection and concentration system wherein groups of solar collectors are combined into a single structure where the face of the collectors lie in essentially a common sun facing plane at noon.

For purposes of the disclosure the present invention is characterized as a unified collector array, or a planar array of heliostats, or collectors as opposed to the prior art distributed field array. Solar energy collection and concentration systems constructed in accordance with the present invention are characterized by efficient use of collector surface and land by utilization of a collector array configuration that optimizes the collection of solar energy during winter periods when the time interval of available sunlight is least so as to provide a relatively constant daily total quantity of usable energy irrespective of season of the year.

In addition, solar energy collectors and concentrators constructed in accordance with the present invention are characterized by the ability to provide concentrated energy to a variety of energy receivers simultaneously as is desirable, or necessary, for industrial processes in which energy loads are located at several discrete points, such as in a chemical processing plant.

A salient aspect of the invention resides in the fact that a supporting structure for a unified collector array in accordance with the present invention provides usable space for industry, family living and many other activities associated with human requirements, thus reducing the capital investment directly attributable to the development of solar energy for an industrialized community. It will be appreciated that the energy collected and concentrated by an array constructed in accordance with the present invention, as briefly discussed above, is easily redirectable to allocate any portion of the array to provide energy to any of many appropriate energy receivers. This feature of programmable direction of the collected and concentrated solar energy permits ready adaptation of the system to automated processing techniques in addition to solar thermal plants for generation of electrical energy.

From the foregoing discussion of some of the salient aspects of the invention, it will be appreciated that a solar collector and concentrator system constructed in accordance with the present invention is a significant step forward in the art in view of the potential utilization of the structure contemplated in a cost sharing manner that provides very beneficial utilization of land area.

Some mirror concentrators designed and constructed in the past have tracked so the solar image remains at the parabolic focal point. This will provide the greatest energy for mirror surface area, but is poses a problem when the structure becomes massive, as the energy receiver must be either carried on the structure carrying the mirror, or the mirror structure must be carried around the receiver and either the mirror or receiver must also move in the vertical direction to permit tracking in declination.

Mirror schemes currently being developed for the solar thermal storage electric generating systems under ERDA auspices utilize a field of mirrors approximating parabolic surfaces, each mirror being mounted on a pedestal with an individual drive mechanism. Utilization of this type of mirror field requires that the receiver be mounted atop a tower which may be in the center of the field or somewhat south of center. For a given entry aperture angle, the total energy input to the receiver is a function of receiver height. Since height above average terrain is generally limited by structural costs as well as aviation interests, this may be a very severe limitation for cost effective design.

Inter-element shading of heliostats is very costly in terms of energy loss encountered. Any design should, therefore, be arranged to provide the most cost effective system considering that shading is an energy intensive cost factor.

The present unified array provides a method for closely spacing heliostat elements without a large shading problem. A system can be devised so that a common foundation and structure can be utilized for a large array. Since any large total power output would be attainable by using as many arrays and central receiver units as might be desired, systems could be sited to allow the structure housing one array to house the receiver and energy converters for the next more northerly array. Using this approach, the shadow of the more southern array should just clear the base of the next northern array at winter solstice. This will allow use of the ground area between arrays for other purposes. In order to prevent vertical shading, the slope of the mirror structural face can vary from base to apex. Use of a narrow energy receiving aperture angle at the central receiver, such as about 60°, will permit horizontal center-to-center distances to be such that about 50% mirror density is attainable without shading for the eight hour period centered on local noon.

Concentration of solar energy by the use of mirrors requires either that the mirror be parabolic, or that the array of mirrors represent a parabolic surface, or that they represent a set of confocal parabolic surfaces. Since large concentrations of energy require extensive surface area, and since the cost of mirror surface is large, economical concentration requires that the angle between the concentration point and the outside boundaries of the mirror system be held to some relatively small angle, generally less than about sixty degrees subtended between the boundaries. A single large mirror becomes more costly to construct and repair, and more difficult to maneuver as its linear dimensions increase.

In the practice of the preferred embodiment of the present invention, an array of small mirrors, each individually steerable, becomes a cost effective approach. In addition, since each mirror moves slowly over a very limited angle, a very rigid drive mechanism can be devised to keep the pointing accuracy to a small deviation and a light structure for the mirror surface will be sufficient to keep the distortion within desired limits.

In order to simplify the tracking of celestial bodies, of which the sun is one, astronomers have long used a set of axes in which one axis is parallel to the earth's polar axis, and the other is perpendicular to it. As the second axis is rotated about the polar axis, it describes a plane parallel to the earth's equatorial plane. This mounting arrangement is known as "equatorial mount".

Any celestial body may be located by an angle off the meridian plane and another angle off this equatorial plane. The angle off the meridian plane is a function of time of day. At any given time in the earth's position along its orbital path, the angle of the body off the equatorial plane is essentially fixed. This angle is called "declination". Due to the inclination of the earth's polar axis to the plane of the orbit around the sun, the declination is a function of time of year.

The equatorial mounting is utilized in a preferred embodiment of the unified array utilizing heliostats in order to simplify tracking. This permits one axis to track at half angle rate for declination as the sun's apparent motion north and south throughout the year, and the other to track at half angle rate of earth's rotation during the day. With this mounting, a heliostat spacing can be made to provide no east-west shading between heliostats for as much as ±4 hours without creating an excessive spacing problem. A choice of vertical angle of the face of the heliostat array will eliminate vertical shading.

If one could stop the movement of the earth around the sun and continue to rotate the earth about its axis, the apparent motion of the sun in respect to an earth based fixed observer would describe a plane perpendicular to the earth's axis, i.e., parallel to the equatorial plane. This plane would define a zenith point having maximum latitudes of north or south approximately 23.4422° and equal to the tilt of the earth's axis of rotation in repsect to the earth's orbital plane, (Plane of the Ecliptic). The intersections of these planes with the earth's surface are known as the Tropic of Cancer and the Tropic of Capricorn. Only at latitudes between these two planes will the sun actually rise or set to the north of the observer in northern latitudes or south of the observer in southern latitudes.

A common misconception, due to choice of local tangent plane and the vertical plane locally perpendicular to the tangent and meridian planes at the observer's position as references, is that the sun in northern latitudes rises and sets north of east between the vernal and autumnal equinoxes, dates on which the sun's apparent path lies in the equatorial plane. This same misconception applies south of the equator as to the sun rising and setting south of east during the other half of the year. A properly constructed sun dial easily shows that this is nothing more than a misconception. The vertical plane described cuts the earth's surface in a great circle passing through the observer's latitude and longitude and the same latitude on the opposing side of the equator at a longitude 180° different from that of the observer. By utilizing the equatorial mount for heliostats in the preferred embodiment of the unified planar array, there is no requirement imposed to track the early and late sun to the north of "east" for a location north of the Tropic of Cancer. The choice of local tangent and vertical planes as reference indicates that such a need does exist for six months of the year for the prior art distributed field heliostat array.

The unified collector array in a preferred embodiment comprises closely spaced two-axis steerable heliostat elements mounted on the terraced east-west wall of a building. This terraced wall is on the side of the building pointing towards the equator and sloping upward towards the pole. In the unified collector array to increase the energy at the central receiver separation in horizontal distance is increased together with an increase in either the height, or, perhaps more simply, the length of the structure. The energy concentration ratio for a given collector array is partially a function of shading of one heliostat element by another due to sun position or angle off the axis of the central receiver aperture. The unified collector array is constructed to eliminate shading of the heliostat elements due to solar declination in even moderate latitudes. The unified array, therefore, elminates the effect of solar declination on the energy concentration ratio, as contrasted with shading in the distributed field array which is a function of both solar declination and the time of day. One of the most significant aspects of the unified array of the present invention is that is may be considered as a new building block for human society opening entirely new avenues of approach for community planning and architectural design. Proper future application of this structure to industrialized society should result in drastic reductions in the investment allocation within the system to solar energy acquisition and utilization.

The unified planar array configured with reflector, i.e., mirror elements, made to the spherical curvature required for edge elements will provide a nearly constant spot size at the central receiver, require a smaller entry area than a similarly sized prior art distributed field array, and reduce problems for elimination of hot spots while reducing reradiation losses from the central receiver.

A collector tracking the sun, with both the sun and the energy receiver on the collector central axis, should, to insure maximum concentration, be a parabolic surface of revolution about the tracking axis. The receiver entry aperture should be located at the parabolic focus in order to collect the most energy while reradiating the least energy back out of the aperture.

Since the sun's angular diameter seen from the earth is about 9.3 milliradians, the central receiver aperture would be about 0.0093 times the focal distance of the parabola. A rule of thumb used by makers of small telescopes is that if the "f number", i.e., the ratio of focal distance to diameter of the optical element, is greater than 9, the error between a spherical and parabolic surface is small enough to neglect. For smaller f numbers, the element should be parabolized. Applied to a collector field, each collector element acts like a part of a parabolic surface. Depending on the size of the element, its position in the field, and the requirements of the central receiver, the desired "parabolic" surface may be approximated as closely as required by either a planar element, a spherical element, a Fresnel mirror, or a parabolic surface. The larger the element, the more closely it must approach the paraboloid.

For approximation of the parabolic segment by a spherical segment, the radius of curvature of the segment will intersect the parabolic axis as the bisector of the angle between the direction of the sun and the direction of the central receiver as viewed at the collector element. For very large f numbers of the system at the position of the element off axis, the radius of curvature will be about twice the focal distance of the parabola. For smaller f numbers, the radius of curvature will vary considerably from this distance over the aperture of the paraboloid. If the sun is not tracked on axis, aberrations will be introduced which will increase as the off axis angle increases.

Another significant aspect of the unified array resides in cost reduction by manufacturing all or very many of the heliostat elements with one fixed curvature for a given focal distance of the array. Further simplification of the central receiver/collector design can be realized due to the low probability of hot spots caused by different spot size of the focused image. Losses due to screening of part of the collected energy by small central receiver apertures and reradiation of energy from the central receiver can be reduced since the required aperture size is considerably smaller than the energy receiving aperture required for a receiver using the prior art distributed field array system.

The total energy available to the central receiver for prior art distributed array design and the array of the present invention is a function of: (a) the size of the collector field; (b) the separation between the central receiver and the collector array in either the vertical or horizontal planes; and (c) the size of the receiver aperture angle. In order to increase this total energy, the size of the heliostat field must first be increased and then either the separation distance of the aperture angle must be increased. However, height restrictions, which may be imposed on the tower for the central receiver will be the limiting factor on maximum energy attainable with a single distributed field collector, the aperture angle seen by the central receiver already being very large.

Compensation for any height restrictions imposed on the unified planar array may be accomplished by simply increasing the horizontal separation between the array and the central receiver. This will impose less severe restrictions on maximum energy attainable, as the aperture angle is relatively very small. In addition, the central receiver for the unified planar array may be located at essentially ground level with a minimal loss in intercept efficiency.

The concentration ratio of a heliostat array is limited by the effective focal length and apparent density of the reflective elements in the aperture angle of the central receiver. The distributed field array has a very low density, about 25%, of collector elements. The unified planar array of the present invention in a preferred embodiment has a collector density in the range of about 50% to 95%.

The distributed field array can only be used with one central receiver in the current designs, and replacement of that central receiver can be a major lost time factor. The unified planar array may be programmed to any of many central receivers. Replacement of a central receiver need not be a lost time factor, as a spare may be installed adjacent to a primary unit at some additional cost.

For a given total maximum energy intercepted at a latitude greater than a few degrees, the land area required by the unified array is less than for the distributed array. The unoccupied land for the system using the unified heliostat array is in relatively large parcels and may be used for other purposes. This is not so with the distributed field heliostat array.

The structure housing the unified heliostat array may be used for many additional purposes. In a large system with multiple arrays, a site layout may be made to use the structure for one array to house the central receiver and associated equipment for a next northerly array. In the prior art distributed field array arrangement, no such multiple use arrangement exists or appears to be practicable.

In a large installation of multiple units of the unified heliostat array, each array structure may be on the order of a few hundred feet tall by a few thousand feed long. Such structures can contain the entire gamut of human related facilities - homes, schools, hospitals, recreation, shopping centers, factories, etc. There are no comparable applications when using the distributed field array to delivery energy to a central receiver.

The distributed field array, being limited to a central receiver located above the field, does not lend itself to directly providing solar energy for a variety of industrial operations. The unified array is readily adapted to a variety of industrial processes, and may be programmed to time share energy required by a variety of receivers, e.g., one could directly supply varying solar energy levels to the different parts of a chemical processing plant.

Use of the building housing a unified planar array for a variety of other human activities is a significant aspect of a preferred embodiment of the present invention. Development of a whole new concept of integrating industrial activity with other community functions is a possibility when groups of such array buildings are utilized as a basic component.

In order to support the needs of the community, solar fueled energy must be provided in a quantity comparable to that provided by fossil fuels. The maximum cost effective electrical energy available from a single central receiver installation appears to be far below that commercially desired. Therefore, it is expected that frequently many planar array/central receiver components will be located at a common site and operated as a system. When this is the case, the cost effectiveness of the unified planar array will be even greater than for comparably sized prior art distributed field arrays. The structure of the unified array is such that the entire set of equipment spaces required for one central receiver/storage/converter group may be housed in the structure holding the array for the next southerly central receiver, with the northernmost structure not housing a central receiver complex, and the southernmost central receiver structure not including a collector array.

The unified planar array may direct its intercepted, i.e., collected and concentrated, energy to a central receiver located at or near ground level i.e., a "depressed" central receiver, with little loss in system efficiency.

As an example of the possibilities for use of the unified heliostat array information in Table I, which was developed as part of a systematic analysis, shows three variations on an arrangement for the array coupled with two different heights for the location of the central receiver.

As seen from Table I, analysis of the energy transfer for a single section, Pattern B of the unified planar array to a central receiver located 15 meters above ground level as compared to the same section directed to a central receiver located 100 meters above ground level, shows a decrease in intercept efficiency from 79% to 76.45%. The high total collected energy of this arrangement is due to a high density of the reflective elements. The efficiency is somewhat impaired in respect to patterns A and D due to east-west interelement shading.

Pattern A, having no shading at M±4 hours, does not provide sufficient energy for the 10MWe application at the summer solstice, although its intercept efficiency using the depressed central receiver is 81.38%. A modification to this design by increasing the overall heliostat height to 112 meters will increase the summer solstice energy intercept to a possibly suitable level with an intercept efficiency of 81.18%.

An alternate approach, again reducing efficiency, would be to slightly increase the horizontal size of the array in order to intercept more energy, and increase the central receiver aperture angle and/or the separation between the central receiver and array. Neither of these patterns is a design having the highest concentration ratio capabilities of the unified heliostat array, as such an array would have a height greater than its length. However, even a very long low array will produce usable ratios for energy concentration.

TABLE I

|  | Pattern A | Pattern B | Pattern D |
| --- | --- | --- | --- |
| Total Horizontal Area m² | 43588.7 | 71828.8 | 48718.3 |
| Array Height m | 100 | 100 | 111.7 |
| Average Intercept Efficiency with C.R. at 100/m | 85.99% | 79% | 85.75% |
| Average Intercept Efficiency with C.R. at 15m | 81.38% | 76.45% | 81.18% |
| Aperture Angle | 60° × 9° | 60° × 9° | 60° × 9.5° |
| 8 hour day average energy intercept | 282.936MWH | 454.728MWH | 316.388MWH |

DESCRIPTION OF THE DRAWINGS

FIG. 1 is a perspective view of a preferred embodiment of a unified array for collection and concentration of solar energy constructed in accordance with the present invention and including a block diagram of a control system for the collection, storage and/or utilization of the collected energy;

FIG. 3 is an enlarged side elevational view of an exemplary solar collector as utilized to provide a unified array as illustrated in FIGS. 1 and 2;

FIG. 4 is a transverse view, partially in section, taken along the line 4—4 of FIG. 3 and illustrating additional details of the exemplary collector element illustrated therein;

FIG. 6 is a side elevational view of a building provided with a unified array of solar energy collectors positioned on a terraced east-west wall for collection and concentration of solar energy being directed to an energy receiver positioned at a height below the top of the unified array;

FIG. 11 is a fragmentary perspective view of an alternate embodiment of a unified array associated with a partially terraced east-west facing portion of a building and further illustrating a horizontally elongated energy receiver operatively associated therewith and carried by a roof portion of the building;

FIG. 12 is a fragmentary side elevational view of an alternate embodiment of a terraced support structure for a plurality of collector elements comprising a unified collector array constructed in accordance with the present invention;

DESCRIPTION OF THE PREFERRED EMBODIMENTS

Figure 2:
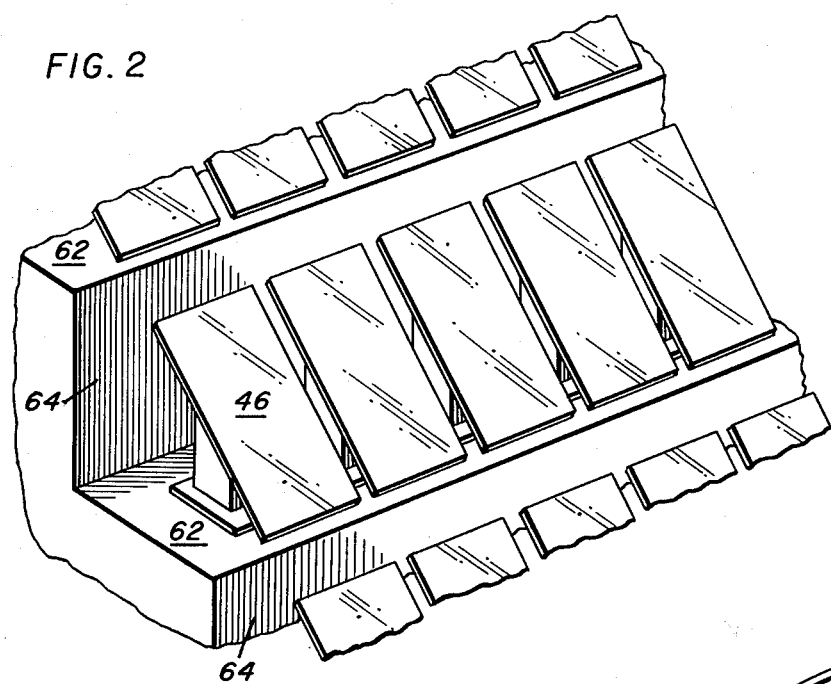
FIG. 2 is an enlarged fragmentary perspective view of a portion of the east-west sun facing wall of one of the structures of FIG. 1 provided with a unified array in accordance with the present invention.

Turning to FIG. 1, a unified array indicated generally at 20 for collection and concentration of solar energy is illustrated in a preferred embodiment as being associated with, and carried by, a structural support indicated generally at 22 that comprises a building 24 adapted, as may be seen generally at 26 to provide the entire gamut of human related facilities, i.e., living quarters, schools, hospitals, recreation, shopping centers, factories, etc.

A unified array indicated generally at 28 is carried by an east-west sun facing a wall 30 having a terraced configuration as will become more apparent as the description proceeds. As seen from the path of the sun's rays indicated generally at 32, solar energy received on the unified array 28 is collected and reflected to a second building indicated generally at 34, which in the embodiment illustrated comprises an industrial process plant housing solar energy receiver units indicated generally at 36, such as comprising direct solar energy user units 38 and a solar energy storage unit 40 associated with an east-west wall 42 of the building 34. Although not visible in FIG. 1, it will be appreciated that the sun facing east-west wall 44 of the building 34 is also preferably provided with a unified array analogous to the array indicated generally at 28 in order to provide collected energy to receivers located at a more southerly area.

It will thus be seen that the building structures 24 and 34 in effect comprise a basic module of a solar collection, concentration and utilization system wherein a site layout may be made to use the building 34, supporting the array, not shown, to house energy receiver and storage units 38 and 40, and associated equipment, for a next northerly array, namely the unified array indicated at 28 carried by the building 24. It will be appreciated that in the prior art distributed field array arrangement, no such multiple use arrangement exists or presently appears to be practical.

As illustrated in the flow diagram of FIG. 1, the unified array 28 is readily adapted to a variety of industrial processes and may be programmed to time share energy required by a variety of receivers such as exemplified by the direct solar energy user units 38 and solar energy storage unit 40, respectively. In addition, in accordance with the flow diagram, it will be appreciated that one could directly supply varying solar energy levels to selected different direct solar energy user units 38 in different parts of the processing plant housed in the building 34.

Thus, as previously discussed, a salient aspect of the present invention resides in integrating industrial activity with other community functions when modules of unified array - carrying buildings are utilized as a basic component.

In FIG. 1, building 24 is illustrated as comprising the northernmost structure not housing an energy receiver or storage means. In addition, it will be appreciated that in the basic module illustrated in FIG. 1, the building 34, which is to the south of the building 24, need not be provided with a unified collector array as indicated generally at 44 in the event that a solar energy receiver is not disposed to the south of the building 34.

As will be readily apparent from FIG. 1, the unified collector array 28 carried by the building 24 is associated with a generally planar wall 30 and directs its intercepted, i.e., collected and concentrated, energy to energy receiver means located at or near ground level with little loss in system efficiency.

The unified array 28 carried by the generally planar east-west sun facing wall 30 of building 24 is in a preferred embodiment, as may be seen from a consideration of FIG. 2, comprised of a plurality of solar energy collector elements 46, which in the embodiment illustrated in FIG. 2 comprise planar mirrors each movably carried by pedestals 48 incorporating means indicated generally at 50 for providing an equitorial mount for each of the collector elements 46.

As seen from a simultaneous consideration of FIGS. 2, 3, 4 and 5, the pedestal 48 by virtue of the inclined upper surface 52 provides a latitude correction mounting for a gear box indicated generally at 54 providing means for tracking of the operatively associated collector element 46 about a polar axis indicated at 56 and a declination axis indicated at 58. Toward this end, appropriate bracket means 60 secured to the rear surface of the collector element 46, as indicated at 60, enables polar and declination axis tracking of the separate collector elements 46 comprising a unified planar array. In this latter regard, in view of the fact that the collector elements 46 track the sun in a manner discussed above, the collector elements 46 are properly characterized as heliostats. The pedestal support may comprise elements, such as cantilevered beams, that project outwardly from a supporting structure, it being understood that the beams extend outwardly to provide a generally terraced support for the collector elements.

The individual mirror elements 46 are preferably chosen at a size which will be convenient for two persons to install and remove. It will be appreciated that the rear of the mirror element is attached to a rigid backing 47 to handle wind loads without distortion of the mirror material. This also provides suitable structural attachment support for the gimbal which provides the tracking capability for the changes in declination of the sun throughout the year.

The gearbox 54 that provides the two axis tracking capability may, for example, comprise a worm drive 55 including a through polar axis drive shaft 57 for one axis. This shaft 57 is such that it may be driven as a single unit or in groups with a single drive motor, not shown. The second axis, the declination axis 58, may also be driven in a ganged manner. Each axis shaft turns only at half sun rate. The daily movement of the earth about its axis will require only about 60 degrees rotation of the polar axis in order to provide eight hours of sun tracking. The declination axis needs to turn only about 24 degrees in six months.

Further considering FIGS. 2 and 3, it will be seen that the unified array carrying east-west sun facing wall 30, characterized as being generally planar, in fact, comprises a terraced support surface including "steps" 62 and "risers" 64. The individual planar mirror collector elements 46 each carried by a pedestal 48 are supported on the terraced steps 62 in very close proximity so that the maximum effective density of the collector surface of a unified planar array constructed in accordance with the present invention will in preferred embodiments approach 100%.

As previously discussed, the highly desirable high density of collector surface, relative to a given terraced support surface is accomplished in accordance with the present invention without undue shading of an individual collector element 46 by adjacent collector elements 46 over a relatively significant span of time.

In this regard, as will become more apparent as the description proceeds, unwanted and undesirable shading of adjacent collector elements is minimized by both the terraced configuration of the unified array support as well as the fact that while presenting a generally planar array, the inclined surfaces 52 of the pedestals 48, or for that matter, the gearbox 54, may in a preferred embodiment, be constructed or utilized to differentially position the plurality of collector elements 46 on a given step 62 in order to achieve the relative position necessary to preclude vertical interelement shading. Preferably, vertical shading of adjacent successive horizontal rows of collector elements 46 is prevented by configuring the effective slope of the generally planar terraced support surface so as to vary the angle from the base to the apex of the structural support, as will become more apparent from the description that follows.

With reference to FIG. 6, it will be appreciated that a plurality of heliostats supported by horizontally extending steps of a terraced east-west sun facing wall of the building 70 may be angularly positioned so as to concentrate the solar energy, as indicated by the arrows, at an energy receiver 72 supported by a relatively short tower 74 as opposed to incorporation of solar energy direct user and storage units in an adjacent and next southerly building as illustrated in FIG. 1. Although not shown, it will be appreciated that the energy receiver 72 comprises a component of an energy utilization, conversion, or storage system. In this regard, it will be appreciated that unified collector arrays constructed in accordance with the present invention may be utilized in conjunction with numerous energy receiver apparatuses, which apparatuses do not comprise the present invention, but are only used in conjunction therewith.

Figure 7:
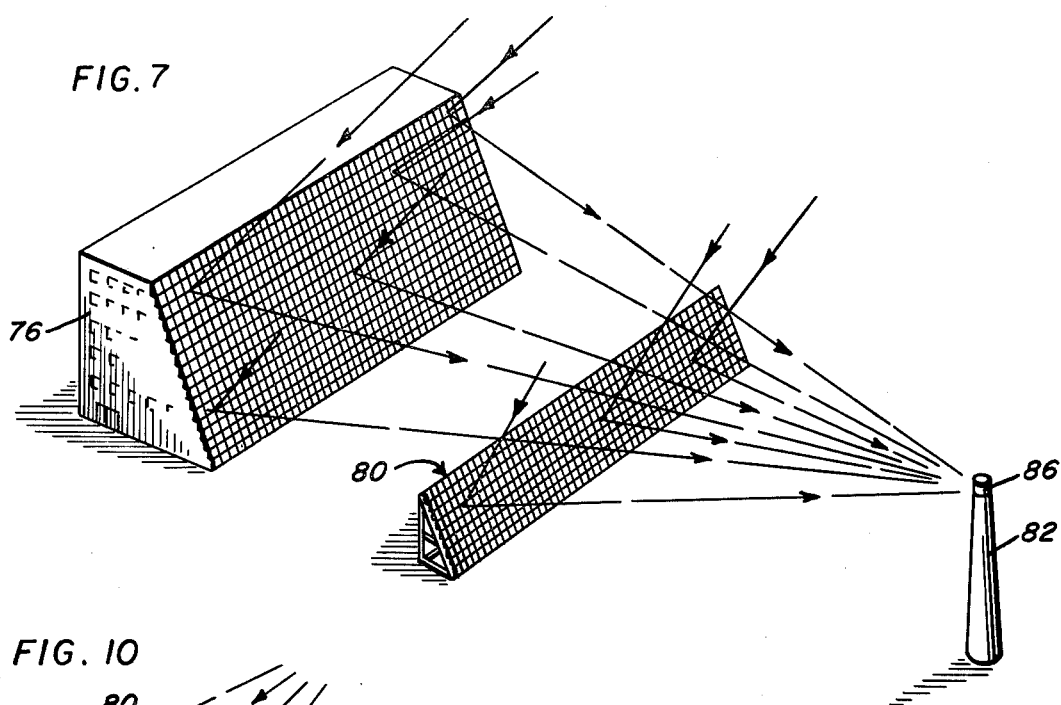
FIG. 7 is a perspective view of a modified form of a solar energy collection, concentration and utilization system constructed in accordance with the present invention and wherein a first unified array is integral with the terraced east-west wall of building and a second unified array is integral with a terraced support structure, other than a building, and wherein the solar energy collected by both arrays is directed to a single energy receiver positioned on a tower.

From a consideration of FIG. 7, it will be seen that a building 76 substantially analogous to the building 70 of FIG. 6, in conjunction with a modified form of a unified planar array 80 collects, concentrates and directs solar energy to a receiver 80 supported on a tower 82 analogous to the receiver tower structure illustrated in FIG. 6. The unified planar array 80 is carried by a terraced support structure, the construction of which may best be appreciated from a simultaneous consideration of FIG. 10 wherein an identical unitary array 80 is illustrated as positioned on a flat-roofed building. It will be understood that the array 80 schematically illustrated in FIG. 7 is substantially identical to the array 80 illustrated in somewhat greater detail in FIG. 10. In this regard, it will be seen that the terraced support structure for the collector elements 46 carried by the pedestals 48 comprises a support appropriately constructed of metal stock, or the like, so as to effectively provide horizontally extending, vertically displaced, steps 84 upon which are positioned the pedestals 48. It will be appreciated that the energy receiver 86 and related support 88 is merely exemplary.

Figure 10:
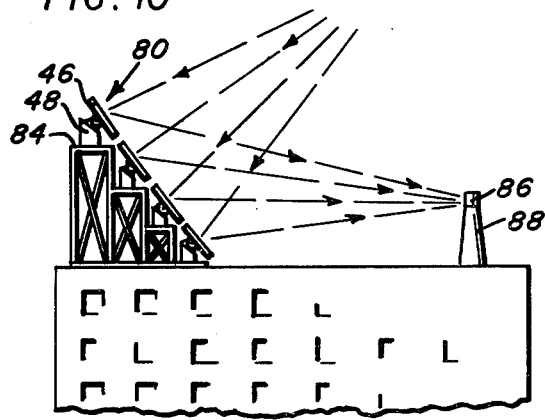
FIG. 10 is a fragmentary side elevational view of one of the exemplary unified arrays of FIG. 7 operatively positioned on the roof of a building and operatively associated with an energy receiver positioned on a relatively low support, or tower, on the roof of the same building.
Figure 8:
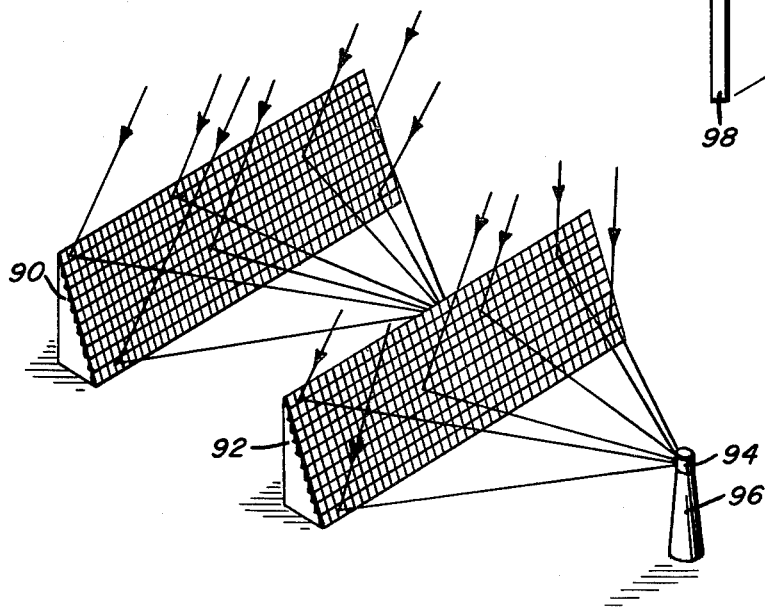
FIG. 8 is a perspective, somewhat schematic, view of a plurality of buildings, such as illustrated in FIG. 1, further utilized in conjunction with an energy receiver means positioned on a tower.

FIG. 8 schematically illustrates the cooperation between support structures 90 and 92, preferably comprising buildings provided with terraced east-west sun facing sloping walls having unitary collector arrays associated therewith and wherein the building 90 is disposed northerly of the building 92 and wherein solar energy collected and concentrated thereby is directed to an energy receiver on the northerly facing east-west rear vertical wall of the building 92 and the southerly facing unified array of the building 92 directs its collected and concentrated solar energy upon an energy receiver 94 carried by a support means 96 analogous to that illustrated in FIGS. 6, 7 and 10.

Figure 9:
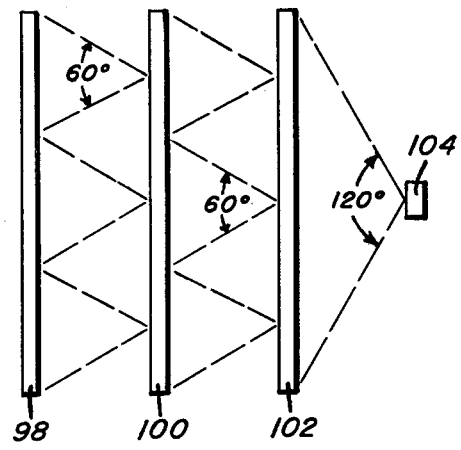
FIG. 9 is a somewhat schematic top elevational view illustrating exemplary energy receiver aperture angles with respect to solar energy collected and concentrated by unified arrays constructed in accordance with the present invention.

Referring to FIG. 9, it will be seen that unified array support structures schematically indicated at 98, 100 and 102 are operatively associated with one another and an energy receiver 104. As diagrammatically illustrated by FIG. 9, unitary arrays of the support structures 98 and 100 have their respective collector elements angularly positioned so as to converge collected solar energy to a narrow energy receiving aperture angle, such as about 60°, and wherein a plurality, namely three energy receivers in the embodiment illustrated, are associated with the next southerly support structure, namely 100 and 102. In addition, in the absence of a unified array support structure to the south of support structure 102, the unified array thereof will be seen to utilize an energy receiver 104 having an energy receiving aperture angle of 120°.

Turning to FIG. 11, it will be seen that in the embodiment of the invention illustrated therein, a terraced support structure indicated generally at 120 may be integrally associated with a roof portion 122 of a building 124 and wherein the roof 122 in fact comprises the first "step" of the terraced support structure 120 and wherein a plurality of additional steps 162, only one of which is shown, may be provided to afford a means of mounting pedestals 48 and associated collector elements 46. In FIG. 11, merely for purposes of illustration, it will be seen that a horizontally extending energy receiver 164 is provided in lieu of the previously illustrated tower-supported energy receivers. Although not shown, it will be understood that the elongated energy absorber receiver 164 may alternatively be positioned wherein its longitudinal axis is normal to that shown and inclined at an angle approximately to degree of latitude of the installation.

In a modified form of the invention illustrated in FIG. 12, instead of requiring a pedestal, such as the pedestal 48, to perform the latitude correction, a chamfered shelf or ledge 148 is an integral part of the unified array support structure. It will be appreciated that the structure of FIG. 12 supporting the collector elements 146 can in fact be utilized in conjunction with the aforedescribed embodiments of the invention. It will be appreciated, of course, that the modification of FIG. 12 normally includes gearboxes, analogous to the gearboxes 54 utilized in conjunction with the previously described embodiments. The ledge-type structure illustrated in FIG. 12 normally contemplates providing sufficient clearance for the elements 146 to at least rotate about the polar axis, which is essentially parallel to the sloped ledge. As is apparent from FIG. 12, the slope 152 on each ledge 152 is equal to the latitude of the installation, which in the embodiment shown is 35°, in order that a gear box, not shown, analogous to the gearbox 54, may be easily aligned for the polar axis. The height of the risers 164, as related to the depth of the steps 162, changes in order to satisfy the requirement of no vertical shading of adjacent elements 46, either from access to the sun or clear view to an associated energy receiver.

From a further consideration of FIG. 12, it will be seen from the reference plane illustrated by the broken line 147, that line 149 connecting the centers of the mirror collector elements 146 is generally parabolic and varies in angle from the base 151 to apex 153 of the structural support 148, as briefly discussed with respect to other embodiments of the invention utilizing pedestals 48.

Figure 13:
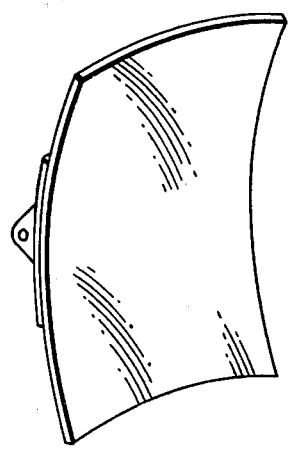
FIG. 13 is a perspective view of another embodiment of a collector element utilized in a unified array in accordance with the present invention.
Figure 5:
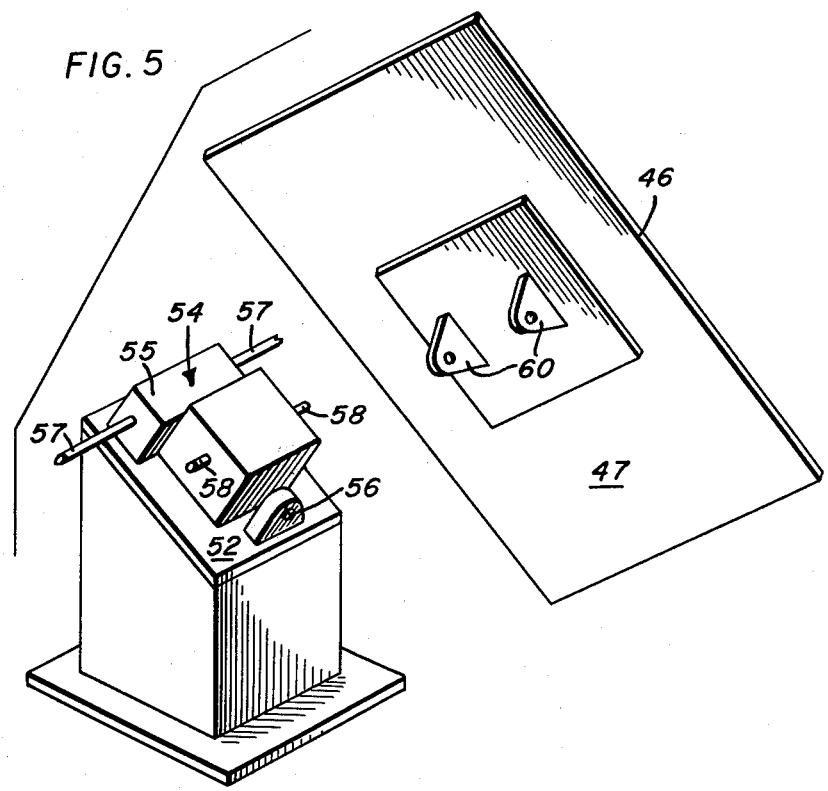
FIG. 5 is a slightly enlarged exploded perspective view of the exemplary collector of FIGS. 3 and 4.
Figure 14:
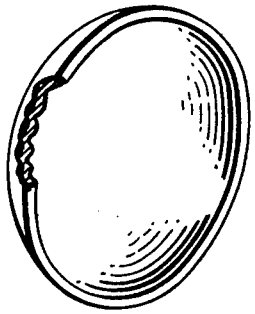
FIG. 14 is a perspective view, with portions shown in section, of a Fresnel mirror collector comprising a collector element of a unified collector array in accordance with the present invention.

While the collector elements, such as the planar mirror collector elements 46 are probably the preferred collector structure from the standpoint of cost, it will be appreciated that as seen in FIGS. 13 and 14, parabolic, spherical and Fresnel mirrors may be utilized in lieu of the planar collector mirrors 46 without departing from the salient aspect of the invention associated with the utilization of terraced support means for the array elements comprising a unified collector array constructed in accordance with the present invention.

The mirror collector elements utilized in constructing a unified array in accordance with the present invention can be characterized as operating segments of a set of confocal parabolas each of which is effectively directed off the axis of an associated energy receiver, or receivers, during most of the period for which sunlight is available in order to efficiently direct the energy incident on each element to a common point or points and thereby concentrate the energy to those points. It is a salient aspect of the present invention that the apparatus disclosed directs the reflected collected solar energy more nearly horizontal rather than vertical. Thus, the energy receiver must be able to "see" each collector element and each element must be accessible to the sun.

In order that the advantages to be derived from the practice of the present invention may be better appreciated, the following comparative data is set forth.

COMPARATIVE DATA

In order to show how two embodiments of the unified array compare technically to current prior art distributed field array projects, the 5MWth Test Facility Bid Plans and one design for a 10 MWe Pilot Plant, see USERDA June 1976 Semi Annual Review of Central Power Projects were chosen as reference designs. The comparative unified array embodiments are not optimal. This is the result of forcing a direct comparison between the two embodiments from a specification for one of them. Other comparative analyses presented herein indicate superior technical performance and the potential for reduction in capital investment using the unified array.

The comparative data is set forth in Table II.

TABLE II

| ENERGY CAPABILITY OF 10MWe PILOT PLANT | | |
|---|---|---|
| 8 Hour Day/95% Availability Annual Energy Data | Tower Center Field Location | Tower South Edge Location |
| Total energy intercepted | 130.1 GWH | 146.76 GWH |
| Average energy per square meter of heliostat | 688 w | 776.4 w |
| Average heliostat area efficiency | 70.37% | 79.42% |

| ENERGY CAPABILITY OF UNIFIED HELIOSTAT ARRAY | | | |
|---|---|---|---|
| 8 Hour Day/95T Availability Annual Energy Data | Pattern A | Pattern B | Pattern C |
| Total energy intercepted | 124.49 GWH | 193.46 GWH | 210.79 GWH |
| Average energy per square meter of heliostat | 835.3 w | 786 w | 819 w |
| Average energy per square meter of extension area only | | | 796.8 w |
| Average heliostat area efficiency | 85.44% | 80.4% | 83.8% |

For the prior art distributed field array of heliostats for solar thermal electric projects, in which the field of heliostats and the central receiver are fixed in a pattern, the radius of curvature of each element is optimized for sun position on the local meridian at the equinox if the central receiver lies on the local meridian plane through the center of the heliostat field.

For the Distributed Field Heliostat of the McDonnell Douglas 10MWe Pilot Plant, it appears that the depth of the center of a heliostat element measured from a plane across the rim will vary from about 1.1 inches at the elements nearest the base of the tower to about 0.239 inch for the elements farthest afield. A focused sun image diameter would vary from a near element size of about 3.3 feet to a far element size of about 20 feet. In order to accept the full image for a far edge element image, the central receiver aperture would need to be about 58 feet in diameter. This area is required due to the large angle to the edge element from the receiver. The range in image sizes should represent a major design problem for elimination of hot spots.

For the unified array of the present invention, utilizing heliostat collector elements, the depth of the heliostat element on center line would be 0.0385 inch. The depth of the heliostat element at the edge of the field would be about 0.0306 inch. This small change in depth is due to the fact that the radius of curvature varies from about 3899 feet to about 4900 feet. The minimum size of sun image for a center line element will be about 24.2 feet, for an edge element about 27.9 feet. If all elements are configured to the curvature for an edge element, the image size for a center line element will increase to about 27.2 feet in diameter. For the elements off axis, the maximum size would be 27.9 feet. In order to accept the full image from the farthest off axis element, the diameter of the central receiver aperture need be only about 32.2 feet. This size aperture would have an area of about 816 square feet, 76 square meters. The use of planar heliostat elements for this specific application would require an aperture about 44 by 39 feet, an area of about 1713 square feet, more than twice the aperture required for a spherically curved element.

The analysis presented herein is an approximation because the data presented in Table IV-I of the June 1976 Semi Annual Review of Central Power Projects is insufficient in detail to prepare a thorough analysis.

Assumptions made in order to perform the calculations were:

The heliostat elements are essentially uniformly distributed across the field.

No inter-element shading occurs.

The central receiver is located at either the center or south edge of the field.

Location of the installation would be at 35° latitude.

Insolation level in the earth tangent plane at noon would be 800 watt meter $^{-2}$; no correction made for time of year.

Sunlight at normal incidence would be the latitude corrected intensity of 977 watt meter $^{-2}$ for 8 hours daily 95% of the year.

To determine the energy intercept capability, the average north-south and east-west cosines of the angle between normal to the heliostat surface and incident flux were computed for time of day and time of year.

The product of these cosines at a particular time multiplied by the normal flux intensity yields the intercept energy capability of the heliostat. The total energy intercept capability for the year based on an 8 hour day at 95% availability has been computed, and the average intercepted energy per square meter of heliostat determined.

In order to develop a unified heliostat array incorporating the present invention and sized comparably to the proposed 10MWe Pilot Plant arrangement a minimum energy intercept capability design goal was set for 35 MW occurring at local noon ± 4 hours for the summer solstice. The same assumptions were made, that the latitude of the installation would be 35°, and that the local tangent plane insolation level would be 800 wm$^{-2}$ with no correction for solar declination. Since the Unified Heliostat Array prefers a side entry central receiver, the aperture of the central receiver and height of the array were set at 100 meters, approximately the height of the center of the central receiver for the McDonnell Douglas distributed field array system.

Since heliostat efficiency decreases rapidly with aperture angle, proportional to distance off axis, the preferred embodiment of the present invention limited the aperture angle to 60° in azimuth. In order to provide a comparison suitable for cost tradeoff analysis, the array dimensions were chosen to provide a base line arrangement in which there would be no interelement shading at local noon ± 4 hours. This is tabulated as Pattern A in Table II. An array in which the elements were spaced as closely as possible without causing obscuration of part of the outer elements as seen from the central receiver, Pattern B, was then fit into this array. Further cost tradeoff capability was then explored by extending the non-shading layout to an aperture angle of 90° and is tabulated as Pattern C.

Pattern A gives a very uniform energy level throughout the day as well as throughout the year. The daily average level of Pattern B has a wide range between local noon and ± 4 hours, with rapid drop off starting as soon as shading starts at ± 2 hours. The total energy intercept capability is higher with the total surface used. However, only the extended portion of Pattern A as extended to Pattern C has a lower efficiency factor, leaving Pattern C with a slightly higher overall efficiency than Pattern B. A comparison of energy intercepts based on an 8 hour day at 95% availability is shown in Table II.

TABLE III

|  | 10 MWe | | Present Invention | | |
|---|---|---|---|---|---|
|  | Tower located Center Field | Tower located South Edge | Pattern A 60° Aperture | Pattern B 60° Aperture | Pattern B 90° Aperture |
| Total number of heliostats | 2350 | 2350 | 15912 | 9639 | 16643 |
| Hellostat size - square meters | 29 | 29 | 5.5742 | 5.5742 | 5.5742 |
| Total mirror area - square meters | 68150 | 68150 | 88696 | 53730 | 92772 |
| Energy rate at local noon - MW | | | | | |
|   Summer solstice | 52.58 | 52.10 | 70.26 | 41.51 | 70.66 |
|   Equinox | 49.74 | 56.31 | 78.46 | 46.36 | 79.32 |
|   Winter solstice | 45.52 | 58.17 | 83.75 | 49.48 | 84.65 |
| Energy rate local noon±4 hours-MW | | | | | |
|   Summer solstice | 45.54 | 45.12 | 42.18 | 35.91 | 61.17 |
|   Equinox | 43.08 | 48.76 | 47.15 | 40.15 | 68.7 |
|   Winter solstice | 39.42 | 50.38 | 50.33 | 42.85 | 73.31 |
| Average total clear day energy MWH | 375.2 | 423.24 | 557.92 | 359.03 | 607.92 |
| Annual total-8 hr day, 95% availability GWH | 130.1 | 146.76 | 193.46 | 124.49 | 210.79 |
| Average energy per square meter when available - watts | 688 | 776.4 | 786 | 835.3 | 819 |
| Heliostat average area efficiency - % | 70.37 | 79.42 | 80.4 | 85.44 | 83.8 |

The Black and Veatch design for the 5MWth Test Facility is analyzed and compared to a comparably sized unified Heliostat array in accordance with the present invention.

BASIC DATA

Latitude of Alburquerque 35.08°N
Tower height 200'
Computations for local noon, equinox
Re: Black & Veatch site plans for heliostat locations
Heliostat size 20' × 20' — 37m
Insolation level 800 wm$^{-2}$ (977.62 wm$^{-2}$ normal incident energy).

The distributed heliostat field designed for the 5MWth Test Facility is to be constructed in two phases. The results of calculations performed to determine the intercepted energy by these heliostat fields to enable a comparison with the present invention is presented in Table IV.

TABLE IV
INTERCEPTED ENERGY CAPABILITY OF 5MWth DISTRIBUTED FIELD TEST FACILITY

| Phase I Computation Summary | 162 heliostats 20' × 20' | |
|---|---|---|
| | meter$^2$ | feet$^2$ |
| Initial Heliostat Area | 5994 | 64800 |
| Normal Area | 5580.86 | 60333.6 |
| Average of Cosine Products | 0.93108 | |
| Intercepted Energy | 5,455,958 watts | |
| Phase II Computation Summary | 190 heliostats 20' × 20' | |
| Added Heliostat Area | 7030 | 76000 |
| Normal Area | 6261.66 | 67693.6 |
| Average of Cosine Products | 0.89071 | |
| Intercepted Energy | 6,121,522 watts | |
| Combined Fields Summary | 352 heliostats | |
| | meter$^2$ | feet$^2$ |
| Total Heliostat Area | 13024 | 140800 |
| Normal Area | 11642.52 | 128027.2 |
| Average of Cosine Products | 0.90286 | |
| Intercepted Energy | 11,577,480 | |
| Energy Contributed by North Row Only | | 519,984 watts |
| | Lateral | Vertical |
| Aperture Angle of Central Receiver | 130.4° | 71° |

In order to evaluate the effectiveness of a unified Heliostat array as compared to the distributed field test facility, it is desirable to compare them at the "same" test site. Table V presents the results of an analysis of the two heliostat fields. Examination of this table shows: that the intercepted energy capability of the unified Heliostat array is 26% greater than the distributed test facility heliostat field; and the unified array of the present invention leaves 93% of the total assigned land unobstructed.

TABLE IV
INTERCEPTED ENERGY CAPABILITY OF 5MWth DISTRIBUTED FIELD TEST FACILITY

| Phase I Computation Summary | 162 heliostats 20' × 20' | |
|---|---|---|
| | meter$^2$ | feet$^2$ |
| Initial Heliostat Area | 5994 | 64800 |
| Normal Area | 5580.86 | 60333.6 |
| Average of Cosine Products | 0.93108 | |

TABLE V

| | 5MWth Test Facility | | |
|---|---|---|---|
| | Black & Veatch | Unified Array | Ratio B & V / OA |
| Heliostat Area | 13,024m$^2$ | 16,499.6m$^2$ | 0.7894 |
| Intercepted Energy | 11,577,480w | 14,554,888w | 0.7954 |
| Total Land Area Assigned | 74,309m$^2$ | 74,309m$^2$ | 1 |
| Land Area Occupied | 13,024m$^2$ | 5197m$^2$ | 2.506 |
| Average Product of Cosines | 0.09286 | 0.90233 | 1.0005874 |
| Aperture Angle of Central Receiver | 5.03 steradians | 0.6 steradians | 8.3836 |

I claim:

1. In a system for collecting and concentrating solar energy for providing highly concentrated solar energy to an energy receiver, the improvement comprising:
   support means including a terraced support structure;
   a plurality of substantially reflective collector elements mounted on said support means in closely spaced apart generally non-interelement shading relationship as a unified array of operative elements;
   said collector elements having surfaces formed as confocal parabolas for effective direction off axis with respect to the energy receiver during most of the period for which sunlight is available;
   said plurality of collector elements being positioned for reflecting solar energy collected generally horizontally to the energy receiver; and
   means for driving said collector elements in tracking relationship with said sun while continuously reflecting solar energy toward said energy receiver.

2. The system of claim 1 wherein the collected energy is concentrated for direction to an energy receiver having a relatively narrow energy receiving aperture.

3. The system of claim 1 wherein the reflective collectors are nonfocusing generally planar reflectors.

4. The system of claim 1 wherein the reflective collectors are generally spherical reflectors.

5. The system of claim 1 wherein the reflective collectors are of generally Fresnel configuration.

6. The system of claim 1 wherein said reflective collector elements are heliostats.

7. The system of claim 1 wherein said support means supports a plurality of horizontally extending rows of said reflective collector elements.

8. The system of claim 1 wherein the interelement relationship establishes a high ratio of reflective surface to non-reflective surface on said terraced support means.

9. The system of claim 8 wherein the reflective surface of the array is in the range of about 50% to 90% of the surface of the terraced support means.

10. The system of claim 9 wherein the concentration of solar energy for delivery to an energy receiver is concentrated at a ratio in the order of up to about 10,000:1.

11. The system of claim 1 wherein the reflective collector elements are provided with equatorial mounting means.

12. The system of claim 1 wherein said support means comprises steps and risers having generally planar normal surfaces and said reflective collector elements are each carried by a pedestal support means.

13. The system of claim 12 wherein said pedestal includes an upper surface inclined at an angle approximately equal to the degree of latitude at which the array is to be operatively positioned.

14. The system of claim 12 wherein said support structure includes a horizontally extending chamfered surface at the juncture of said step and riser surfaces and said chamfered surface is inclined at an angle approximately equal to the degree of latitude at which the array is to be operatively positioned.

15. In a system for collecting and concentrating solar energy for providing highly concentrated solar energy to an energy receiver, the improvement comprising:

support means including a terraced support structure;

a plurality of substantially reflective collector elements mounted on said support means in closely spaced-apart generally non-interelement shading relationship as a unified array of operative elements;

said collector elements having surfaces formed as confocal parabolas for effective direction off axis with respect to the energy receiver during most of the period for which sunlight is available;

said plurality of collector elements being positioned for reflecting solar energy collected generally horizontally to the energy receiver;

means for driving said collector elements in tracking relationship with said sun while continuously reflecting solar energy toward said receiver; and said support means for supporting said plurality of collector elements comprising a generally terraced generally east-west sun facing wall of a building.

16. The system of claim 15 including a plurality of northerly-southerly disposed generally east-west extending buildings functioning as said support means having first generally terraced generally east-west sun facing walls and having second generally east-west nonsun facing substantially vertical walls wherein said plurality of buildings include at least one energy receiver means mounted in at least one vertical wall adapted to receive solar energy collected, concentrated and generally horizontally reflected from said next adjacent building 17. A solar energy system for collecting and concentrating solar energy, comprising;

support means including an integral terraced support structure;

a receiver located at or near gound level spaced from said support means and having a generally planar solar energy receiving aperture;

a plurality of substantially reflective collector elements mounted on said support means in closely spaced apart generally non-interelement shading relationship as a unified substantially planar array at a slope with respect to a ground plane such that the solar energy received by said collector elements is generally reflected horizontally or downwardly to said receiver;

said collector elements having reflective surfaces for effective off-axis tracking of the sun with respect to said receiver during the period for which sunlight is available and for reflecting solar energy to said energy receiving aperture;

means for driving said collector elements in tracking relationship with the sun while continuously reflecting solar energy toward the receiver aperture.

18. The solar energy system of claim 17 wherein said plurality of substantially reflective collector elements have substantially the same radius of curvature.

19. The solar energy system of claim 17 wherein said plurality of substantially reflective collector elements have two different radii of curvature in respect to a set or orthogonal axes in the reflective surface of an ellipsoidal solid.

20. The solar energy system of claim 17, wherein said driving means includes two-axis tracking means.

21. The solar energy system of claim 17 wherein said planar array and said generally planar solar energy receiving aperture are mutually at right angles to a north-south axis therethrough.

22. The solar energy system of claim 20, wherein said integral terraced support structure has surface portions set at an angle relative to the ground plane substantially equal to the local latitude such that a north-south line in the plane of said surface portions is substantially parallel to the earth's polar axis.

23. The solar energy system of claim 17 further comprising a first building in which said receiver is located and wherein said support means further includes a second building on which said terraced support structure is mounted.

* * * * *

UNITED STATES PATENT AND TRADEMARK OFFICE
CERTIFICATE OF CORRECTION

PATENT NO. : 4,137,897
DATED : February 6, 1979
INVENTOR(S) : WALTER T. MOORE

It is certified that error appears in the above-identified patent and that said Letters Patent are hereby corrected as shown below:

On first page, Assignee is missing. Should be --

Assignee - VEDA, INCORPORATED
                Arlington, Virginia --.

In Column 1, line 8, "condiderable" should be -- considerable --

In Column 2, line 13, "feed" should be -- feet --.

In Column 3, line 29, "is" should be -- it --.

In Column 4, line 64, "repsect" should be -- respect --.

In Column 5, line 47, "is" should be -- it --.

In Column 7, line 37, "delivery" should be -- deliver --.

In Column 9, line 20, between "of building" insert -- a --.

In Column 10, line 67, "equitorial" should be -- equatorial --.

In Column 13, line 42, "152" should be -- 162 --.
In Column 14, line 44, "95T" should be -- 95% -- (Table II)
In Column 16, lines 14 and 15, the sentence reading "and that the local tangent plane insolation level would be" appears to be in BOLD print. Please correct to show sentence to be in regular typed print.

UNITED STATES PATENT AND TRADEMARK OFFICE
CERTIFICATE OF CORRECTION

PATENT NO. : 4,137,897

DATED : February 6, 1979

INVENTOR(S) : Walter T. Moore

It is certified that error appears in the above—identified patent and that said Letters Patent is hereby corrected as shown below:

Columns 15 thru 20 should be deleted to insert the attached columns 15 thru 20 respectively therefor.

Signed and Sealed this

Twelfth Day of February 1980

[SEAL]

Attest:

SIDNEY A. DIAMOND

Attesting Officer

Commissioner of Patents and Trademarks